United States Patent [19]

Kudo et al.

[11] 4,156,762

[45] May 29, 1979

[54] PROCESS FOR PRODUCING LIGHT-COLORED CLEAR PETROLEUM RESINS

[75] Inventors: Ken-ichi Kudo; Yoshihiko Kitagawa; Hideyuki Kuribayashi, all of Niihama; Seiko Miura, Ibaraki, all of Japan

[73] Assignee: Sumitomo Chemical Company, Limited, Osaka, Japan

[21] Appl. No.: 908,502

[22] Filed: May 22, 1978

[30] Foreign Application Priority Data

May 26, 1977 [JP] Japan .................................. 52-62599

[51] Int. Cl.$^2$ ........................... C08F 2/00; C08F 4/14; C08F 36/00; C08F 4/52
[52] U.S. Cl. ..................................... 526/76; 526/216; 526/237; 526/281; 526/290
[58] Field of Search .................. 526/216, 237, 76, 290

[56] References Cited

U.S. PATENT DOCUMENTS

| | | | |
|---|---|---|---|
| 3,639,366 | 2/1972 | Broca et al. | 526/237 |
| 3,709,854 | 1/1973 | Hepworth et al. | 526/237 |
| 3,763,125 | 10/1973 | Moody et al. | 526/237 |
| 3,817,953 | 6/1974 | Younger | 526/237 |
| 3,880,820 | 4/1975 | Sato | 526/237 |
| 3,929,747 | 12/1975 | Kudo et al. | 526/237 |

*Primary Examiner*—Herbert J. Lilling
*Attorney, Agent, or Firm*—Stevens, Davis, Miller & Mosher

[57] ABSTRACT

In the production of petroleum resins by polymerizing an unsaturated hydrocarbon-containing fraction having a boiling point ranging from $-20°$ to $200°$ C. at $-50°$ to $100°$ C., an improvement for producing light-colored clear petroleum resins which comprises using an aluminum chloride/fatty acid ester/aromatic hydrocarbon complex solution.

7 Claims, No Drawings

PROCESS FOR PRODUCING LIGHT-COLORED CLEAR PETROLEUM RESINS

The present invention relates to a process for producing colorless clear petroleum resins by polymerization of an unsaturated hydrocarbon-containing fraction having a boiling point ranging from −20° to 200° C. produced on cracking or reforming of petroleum.

Hitherto, aliphatic petroleum resins used as a tackifier for adhesive tapes or synthetic rubbers are produced by contacting an unsaturated hydrocarbon-containing C$_4$-C$_5$ fraction having a boiling point ranging from −20° to 70° C., which is produced by cracking or reforming of petroleum, with the so-called Friedel-Crafts type catalyst such as boron trifluoride, boron trifluoride/ether complex, aluminum chloride or aluminum bromide.

Of these catalysts, aluminum chloride is relatively low-cost and has a high catalytic activity as compared with other catalysts, and therefore it is most commonly used as a catalyst for petroleum resins. But, problems are often caused in industrial production since aluminum chloride is solid.

For example, in order to allow the polymerization to proceed uniformly, operations to pulverize or dissolve aluminum chloride are necessary.

U.S. Pat. No. 3,639,366 discloses that the equimolar mixture of aluminum chloride, hydrogen chloride and aromatic hydrocarbon forms a complex which is a liquid catalyst suitable for production of petroleum resins. Such the aluminum chloride complex catalyst containing hydrogen chloride has a high polymerization activity, but the resins produced have a bad color.

For the reasons as described above, the inventors extensively studied to develop liquid-form aluminum chloride catalysts of high activity without using hydrogen chloride. As a result, it was found that light-colored clear petroleum resins are obtained by using, as a polymerization catalyst for production of petroleum resins, an aluminum chloride/fatty acid ester/aromatic hydrocarbon complex solution, which is produced by reacting (A) aluminum chloride with (B) a fatty acid ester of the formula, $C_mH_{2m+1}COOC_nH_{2n+1}$ (in which m is an integer of 0 to 10 and n is an integer of 1 to 5) in (C) an aromatic hydrocarbon, with the molar ratio of (A):(B):(C) as 1:0.25 to 0.75:1.0 to 2.4. Thus, the inventors attained to the present invention.

An object of the present invention is to provide a process for producing light-colored clear petroleum resins by polymerizing an unsaturated hydrocarbon-containing fraction having a boiling point ranging from −20° to 200° C. at −50° to 100° C., characterized by using an aluminum chloride/fatty acid ester/aromatic hydrocarbon complex solution in an amount of 0.3 to 5% by weight (converted to aluminum chloride basis) based on said fraction, said complex solution comprising (A) aluminum chloride, (B) fatty acid ester of the formula, $C_mH_{2m+1}COOC_nH_{2n+1}$ (in which m is an integer of 0 to 10 and n is an integer of 1 to 5), and (C) aromatic hydrocarbon, and the molar ratio of (A):(B):(C) being 1:0.25 to 0.75:1.0 to 2.4.

The petroleum resins produced according to the present invention are particularly superior in color and clearness so that they can preferably be used as tackifiers for paints or traffic paints and hot-melt adhesives in addition to the conventional usages of the resins such as tackifiers for adhesive tapes or synthetic rubbers.

In the present invention, oil used as a material for polymerization, which are the same as used in the production of common petroleum resins, is an unsaturated hydrocarbon-containing fraction having a boiling point ranging from −20° to 200° C. produced on cracking or reforming of petroleum. And, the fraction contains unsaturated hydrocarbons siuch as aliphatic and cyclic olefins and dienes. In the present invention, styrenes may be added to the fraction. More preferably, the oils are a C$_4$-C$_5$ fraction having a boiling point ranging from −20° to 70° C. and containing unsaturated hydrocarbons but not indenes adversely affecting color, or a mixture of the fraction and styrenes or pinenes.

The styrenes used in the present invention include styrene, α-methylstyrene, vinyltoluene and mixtures thereof. The pinenes include α-pinene, β-pinene and mixtures thereof.

The proportion of the fraction to styrenes or pinenes can be properly varied depending on required physical properties of petroleum resins.

Further, an unsaturated hydrocarbon-containing C$_5$ fraction having a boiling point ranging from 0° to 70° C. is preferably used in the present invention.

As the fatty acid ester of the formula, $C_mH_{2m+1}COOC_nH_{2n+1}$ (in which m is an integer of 0 to 10 and n is an integer of 1 to 5), used in the present invention, there may be given methyl formate, ethyl formate, n-propyl formate, isopropyl formate, n-butyl formate, isobutyl formate, n-amyl formate, methyl acetate, ethyl acetate, n-propyl acetate, isopropyl acetate, n-butyl acetate, n-amyl acetate, methyl valerate, ethyl valerate, methyl butyrate, ethyl butyrate, n-propyl butyrate, isopropyl butyrate, n-butyl butyrate, methyl propionate, ethyl propionate, n-propyl propionate, isopropyl propionate, n-butyl propionate, isobutyl propionate, methyl caproate, ethyl caproate, n-propyl caproate, isopropyl caproate, n-butyl caproate, isobutyl caproate, methyl caprylate, ethyl caprylate, methyl caprate, ethyl caprate and the like. Of these compounds, C$_1$-C$_5$ alkyl esters of acetic acid or propionic acid are preferred. In the above formula representing the fatty acid esters, the values of m and n exceeding 10 and 5, respectively, alre not desirable because a part of such fatty acid esters sometimes remains unremoved as a catalyst residue in the resulting petroleum resins.

The aromatic hydrocarbon used in the present invention includes benzene, toluene, ethylbenzene, propylbenzene, xylene, cumene, butylbenzene, hemimellitene, pseudocumene, mesitylene and mixtures thereof. Of these compounds, toluene, ethylbenzene, xylene, mesitylene and mixtures thereof are preferred, and a mixture of ethylbenzene and xylene is particularly preferred.

The amount of fatty acid ester used is within the range of 0.25 to 0.75 mole, preferably 0.3 to 0.6 mole, based on 1 mole of aluminum chloride. When the amount is less than 0.25 mole, a uniform complex solution can not be obtained. While, when it exceeds 0.75 mole, the catalyst obtained is so much reduced in catalytic activity that it is very poor in industrial value. The amount of aromatic hydrocarbon used is within the range of 1 to 2.4 moles, preferably 1.4 to 2.2 moles, based on 1 mole of aluminum chloride. When the amount is outside the former range, the complex solution obtained is not uniform so that it does not satisfy the objects of the present invention.

How to prepare the catalyst of the present invention is not particularly limited. Any method may be employed if the components of the produced aluminum chloride/fatty acid ester/aromatic hydrocarbon complex solution are within the ranges described above. For example, the catalyst can be easily prepared by reacting aluminum chloride with the fatty acid ester at 30° to 70° C., preferably 40° to 60° C., in the aromatic hydrocarbon with stirring.

The amount of catalyst used is within the range of 0.3 to 5% by weight (converted to aluminum chloride basis), preferably 0.5 to 3% by weight, based on the unsaturated hydrocarbon-containing fraction. When the amount is 0.3% by weight or less, the yield of resin is low. While, when it is 5% by weight or more, the resins obtained have a bad color. In either case, the objects of the present invention can not be achieved.

The polymerization temperature is within the range of −50° to 100° C., preferably −30° to 70° C., in terms of resin color and compatibility. The polymerization time is preferably within the range of 5 minutes to 5 hours.

Use of solvent is not particularly limited. For example, aliphatic hydrocarbons such as hexane and heptane, or aromatic ones such as benzene, toluene, xylene and ethylbenzene can be used.

The polymerization of the present invention may be carried out in any form of batchwise, semibatchwise and continuous processes.

The polymerized oil obtained according to the present invention is contacted with, for example, an alcohol to stop the polymerization, washed with an alkaline solution and water to remove the catalyst residue, and freed from the unreacted materials, solvents and low molecular weight polymers by distillation or concentration to obtain the petroleum resin.

Next, the present invention will be illustrated specifically with reference to the following examples, which are not however to be interpreted as limiting the present invention thereto. Of the physical properties of resin in the examples, a softening point was measured according to the ring and ball method (JIS K 2531); a molecular weight (number average molecular weight) was measured according to the vapor-pressure osmometry techniques; and a color was expressed in Gardner color number of a toluene solution containing 50% by weight of resin (ASTM D 154-58). All percentages in the examples are by weight.

EXAMPLE 1

Atmosphere in a 300-ml glass reactor equipped with a thermometer, reflux condenser, dropping funnel and stirrer was replaced with nitrogen. Thereafter, 15.0 g of aluminum chloride and 23.9 g of xylene were charged therein, and 5.0 g of ethyl acetate was added dropwise from the dropping funnel over 30 minutes with stirring at 35° C., followed by stirring for further 1 hour. Thus, an aluminum chloride/ethyl acetate/xylene complex catalyst (molar ratio of aluminum chloride:ethyl acetate:xylene=1:0.5:2) was prepared in a liquid form.

Polymerization was carried out as follows: Atmosphere in a 300-ml glass reactor equipped with a thermometer, reflux condenser, dropping funnel and stirrer was replaced with nitrogen; 150 g of a fraction having a boiling point ranging from 0° to 70° C. which consists essentially of a $C_5$ fraction (composition: 24.9% of diolefins including 12.8% of isoprene and 9.9% of 1,3-pentadiene; 25.0% monoolefins; 47.4% of paraffins; and 2.7% of others) was charged therein; the temperature of the reactor was fixed at 25° C.; and then 4.37 g of the above liquid-form aluminum chloride/ethyl acetate/xylene complex catalyst (the amount of aluminum chloride used is 1.0% by weight based on the $C_5$ fraction) was added dropwise over 10 minutes, followed by reaction for further 30 minutes. The polymerization was stopped by adding methanol to the reaction solution, and the solution was washed with 10% aqueous sodium hydroxide solution and then with water, and vacuum-concentrated in a rotary evaporator at 230° C. and 150 mmHg in nitrogen stream. Then, the objective resin was obtained in a yield of 31.2%. The physical properties of the resin were as follows: softening point 84.2° C.; molecular weight 1760; and Gardner color number 2.

EXAMPLE 2

Procedure was carried out in the same manner as in Example 1 but using 4.18 g of a liquid-form aluminum chloride/ethyl acetate/xylene complex catalyst (molar ratio of aluminum chloride:ethyl acetate:xylene=1:0.3:2) prepared according to Example 1. The resin was obtained in a yield of 32.4%. Softening point 92.0° C. Molecular weight 1820. Color 2.

EXAMPLE 3

Procedure was carried out in the same manner as in Example 1 but using 4.69 g of a liquid-form aluminum chloride/ethyl acetate/mesitylene complex catalyst (molar ratio of aluminum chloride:ethyl acetate:mesitylene=1:0.5:2) prepared according to Example 1. The resin was obtained in a yield of 29.4%. Softening point 85.4° C. Molecular weight 1740. Color 2.

EXAMPLE 4

Procedure was carried out in the same manner as in Example 1 except that catalyst, material oil and polymerization temperature were altered as follows:

Catalyst: 9.38 g of a liquid-form aluminum chloride/ethyl acetate/toluene complex catalyst (molar ratio of aluminum chloride:ethyl acetate:toluene=1:0.6:1) prepared according to Example 1.

Material oil: an oil comprising 15 g of a $C_4$ fraction (butadiene 36.8%, isobutylene 31.2%, cis- and trans-2-butene 10.6%, 1-butene 14.8%, n-butane 3.7%, and others 2.9%) and 135 g of a $C_5$ fraction (17.8% of diolefins including 10.9% of isoprene and 5.5% of 1,3-pentadiene; 24.4% of monoolefins; 54.1% of paraffins; and 3.7% of others).

Polymerization temperature: 0° C.

Thus, the resin was obtained in a yield of 30.1%. Softening poing 79.3° C. Molecular weight 1330. Color 3.

EXAMPLE 5

Procedure was carried out in the same manner as in Example 1 except that catalyst, material oil and polymerization temperature were altered as follows:

Catalyst: 9.23 g of a liquid-form aluminum chloride/n-butyl propionate/mixed xylene complex catalyst [molar ratio of aluminum chloride:n-butyl propionate:mixed xylene (ethylbenzene 45% and xylene 55%)=1:0.5:2] prepared according to Example 1.

Material oil: an oil having the same composition as in Example 4.

Polymerization temperature: −20° C.

Thus, the resin was obtained in a yield of 31.6%. Softening point 74.3° C. Molecular weight 1430. Color 2.

EXAMPLE 6

Procedure was carried out in the same manner as in Example 1 except that catalyst and material oil were altered as follows:

Catalyst: 4.93 g of a liquid-form aluminum chloride-/ethyl caprylate/mixed xylene complex catalyst [molar ratio of aluminum chloride:ethyl caprylate:-mixed xylene (ethylbenzene 45% and xylene 55%)=1:0.5:2] prepared according to Example 1.

Material oil: a mixed oil comprising 10 g of the same $C_4$ fraction as in Example 4, 135 g of the same $C_5$ fraction as in Example 4 and 5 g of α-pinene.

Thus, the resin was obtained in a yield of 32.5%. Softening point 83.1° C. Molecular weight 1580. Color 3.

EXAMPLE 7

Procedure was carried out in the same manner as in Example 1 except that catalyst, material oil and polymerization temperature were altered as follows:

Catalyst: 3.02 g of a liquid-form aluminum chloride/n-butyl acetate/mixed xylene complex catalyst [molar ratio of aluminum chloride:n-butyl acetate:-mixed xylene (ethylbenzene 45% and xylene 55%)=1:0.5:2] prepared according to Example 1.

Material oil: a mixed oil comprising 90 g of the same $C_5$ fraction as in Example 1, 10 g of styrene.

Solvent: 10 g of n-hexane.

Polymerization temperature: 50° C.

Thus, the resin was obtained in a yield of 35.9%. Softening point 84.0° C. Molecular weight 1540. Color 2.

COMPARATIVE EXAMPLE 1

Procedure was carried out in the same manner as in Example 1 but using 4.30 g of a liquid-form aluminum chloride/hydrogen chloride/xylene complex catalyst (molar ratio of aluminum chloride:hydrogen chloride:xylene=1:0.5:2) prepared by passing hydrogen chloride gas in place of adding ethyl acetate in Example 1. Thus, the resin was obtained in a yield of 35.0%. Softening point 97.5° C. Molecular weight 1620. Color 6. It is apparent from the results that the yield of resin is high since the liquid-form aluminum chloride/hydrogen chloride/xylene complex catalyst has a high activity, but that the color of resin is bad.

COMPARATIVE EXAMPLE 2

Procedure was carried out in the same manner as in Example 1 but using 5.79 g of a liquid-form aluminum chloride/n-butyl stearate/xylene complex catalyst (molar ratio of aluminum chloride:n-butyl stearate:xylene=1:0.5:2) prepared using n-butyl stearate in place of ethyl acetate in Example 1. Thus, the resin was obtained in a yield of 16.3%. Softening point 73.2° C. Molecular weight 1240. Color 3.

This catalyst was poor in activity, and n-butyl stearate was detected as residue in the produced resin.

COMPARATIVE EXAMPLE 3

In Example 1, the catalyst was prepared using 2.0 g of ethyl acetate in place of 5.0 g of the same, but aluminum chloride was not dissolved. Consequently, a liquid-form aluminum chloride/ethyl acetate/xylene complex catalyst having an aluminum chloride:ethyl acetate:xylene molar ratio of 1:0.2:2 was not obtained.

COMPARATIVE EXAMPLE 4

Procedure was carried out in the same manner as in Example 1 but using 14.61 g of a liquid-form aluminum chloride/ethyl acetate/xylene complex catalyst (molar ratio of aluminum chloride:ethyl acetate:xylene=1:1:2) prepared using 10.0 g of ethyl acetate in place of 5.0 g of the same in Example 1. Thus, the resin was obtained in a yield of 5.0%. Softening point 60° C. or less. Molecular weight 970. Color 3.

As apparent from the result, the catalyst prepared using ethyl acetate of 1 mole based on 1 mole of aluminum chloride was very low in activity.

The results of experiment were tabulated in Table 1. All the resins in Examples 1 to 7 prepared using the fatty acid esters were superior in color to the resin in Comparative example 1 prepared using hydrogen chloride.

Table 1

| Experiment | Polymerization conditions and results | | | |
|---|---|---|---|---|
| | $AlCl_3$ (a) | Fatty acid ester (b) | Aromatic hydrocarbon (c) | Molar ratio (a)/(b)/(c) |
| Example-1 | " | Ethyl acetate | Xylene | 1/0.5/2 |
| Example-2 | " | " | " | 1/0.3/2 |
| Example-3 | " | " | Mesitylene | 1/0.5/2 |
| Example-4 | " | " | Toluene | 1/0.6/1 |
| Example-5 | " | n-Butyl propionate | Mixed xylene | 1/0.5/2 |
| Example-6 | " | Ethyl caprylate | " | 1/0.5/2 |
| Example-7 | " | n-Butyl acetate | " | 1/0.5/2 |
| Comparative example-1 | " | Hydrogen chloride | Xylene | 1/0.5/2 |
| example-2 | " | n-Butyl stearate | " | 1/0.5/2 |
| example-3 | " | Ethyl acetate | " | 1/0.2/2 |
| example-4 | " | " | " | 1/1/2 |

| | Polymerization conditions | | | Results | | | |
|---|---|---|---|---|---|---|---|
| Material oil | Amount of catalyst (%) (1) | Temperature (°C.) | Time (min) | Yield (%) (2) | Softening point (°C.) | Molecular weight | Color |
| $C_5$ fraction 150g | 1.0 | 25 | 40 | 31.2 | 84.2 | 1760 | 2 |
| " | " | " | " | 32.4 | 92.0 | 1820 | 2 |
| " | " | " | " | 29.4 | 85.4 | 1740 | 2 |
| $C_4$ fraction 15g | 3.0 | 0 | " | 30.1 | 79.3 | 1330 | 3 |
| $C_5$ fraction 135g | 2.0 | −20 | " | 31.6 | 74.3 | 1430 | 2 |
| $C_4$ fraction 10g | 1.0 | 25 | " | 32.5 | 83.1 | 1580 | 3 |

Table 1-continued

| Polymerization conditions and results | | | | | | | |
|---|---|---|---|---|---|---|---|
| $C_5$ fraction 135g<br>α-Pinene 5g | | | | | | | |
| $C_5$ fraction 90g<br>Styrene 10g | " | 50 | " | 35.9 | 84.0 | 1540 | 2 |
| $C_5$ fraction 150g | 1.0 | 25 | " | 35.0 | 97.5 | 1620 | 6 |
| " | " | " | " | 16.3 | 73.2 | 1240 | 3 |
| Catalyst was not formed, polymerization was impossible | | | | | | | |
| $C_5$ fraction 150g | 3.0 | 25 | 40 | 5.0 | <60 | 970 | 3 |

Note:
(1) Proportion of $AlCl_3$ used to $C_4$-$C_5$ fraction and styrene or α-pinene
(2) Yield of resin based on $C_4$-$C_5$ fraction and styrene or α-pinene

What is claimed is:

1. In the production of petroleum resins by polymerizing an unsaturated hydrocarbon-containing fraction having a boiling point ranging from −20° C. to 200° C. at −50° to 100° C., an improvement for producing light-colored clear petroleum resins which comprises using an aluminum chloride/fatty acid ester/aromatic hydrocarbon complex solution in an amount of 0.3 to 5% by weight (converted to aluminum chloride basis) based on the weight of said fraction, said complex solution being a reaction product of (A) aluminum chloride, (B) a fatty acid ester of the formula, $C_mH_{2m+1}COOC_nH_{2n+1}$ (wherein m is an integer of 0 to 10 and n is an integer of 1 to 5), and (C) aromatic hydrocarbon, at a temperature of −30° to 70° C., at a molar ratio (A):(B):(C) of 1:0.25 to 0.75:1.0 to 2.4.

2. A process according to claim 1 wherein said unsaturated hydrocarbon-containing fraction may be mixed with styrenes or pinenes.

3. A process according to claim 2 wherein said unsaturated hydrocarbon-containing fraction is an unsaturated hydrocarbon-containing $C_4$-$C_5$ fraction having a boiling point ranging from −20° to 70° C. produced on cracking or reforming of petroleum.

4. A process according to claim 1 wherein said unsaturated hydrocarbon-containing fraction is an unsaturated hydrocarbon-containing $C_5$ fraction having a boiling point ranging from 0° to 70° C. produced on cracking or reforming of petroleum.

5. A process according to claim 1 wherein said fatty acid ester is $C_1$-$C_5$ alkyl esters of acetic acid or propionic acid.

6. A process according to claim 1 wherein said aromatic hydrocarbon is a compound selected from the group consisting of toluene, ethylbenzene, xylene and mesitylene, or a mixture thereof.

7. A process according to claim 6 wherein said aromatic hydrocarbon is a mixture of ethylbenzene and xylene.

* * * * *